US012308706B2

(12) United States Patent  
Hara et al.

(10) Patent No.: US 12,308,706 B2  
(45) Date of Patent: May 20, 2025

(54) MANUFACTURING METHOD OF ROTOR

(71) Applicants: AISIN CORPORATION, Aichi (JP); AMINO CORPORATION, Fujinomiya (JP)

(72) Inventors: Yutaka Hara, Kariya (JP); Takehiko Adachi, Kariya (JP); Mariko Saito, Kariya (JP); Noriyuki Watanabe, Fujinomiya (JP); Yuji Terauchi, Fujinomiya (JP)

(73) Assignees: AISIN CORPORATION, Kariya (JP); AMINO CORPORATION, Fujinomiya (JP)

(*) Notice: Subject to any disclaimer, the term of this patent is extended or adjusted under 35 U.S.C. 154(b) by 543 days.

(21) Appl. No.: 17/624,153

(22) PCT Filed: Aug. 7, 2020

(86) PCT No.: PCT/JP2020/030477  
§ 371 (c)(1),  
(2) Date: Dec. 30, 2021

(87) PCT Pub. No.: WO2021/025159  
PCT Pub. Date: Feb. 11, 2021

(65) Prior Publication Data  
US 2022/0352773 A1 Nov. 3, 2022

(30) Foreign Application Priority Data

Aug. 7, 2019 (JP) ................................. 2019-145179

(51) Int. Cl.  
H02K 1/28 (2006.01)  
H02K 15/02 (2006.01)

(52) U.S. Cl.  
CPC ............... *H02K 1/28* (2013.01); *H02K 15/02* (2013.01)

(58) Field of Classification Search  
CPC ........ H02K 1/28; H02K 15/02; B21D 26/033; B21D 39/08  
See application file for complete search history.

(56) References Cited

U.S. PATENT DOCUMENTS

2011/0241469 A1* 10/2011 Kjeldsteen ............. H02K 15/03  
29/598  
2014/0097711 A1* 4/2014 Kubes ..................... H02K 7/04  
310/58

(Continued)

FOREIGN PATENT DOCUMENTS

DE 102009012819 A1 * 9/2010 ............... H02K 1/12  
DE 102018115244 A1 8/2018

(Continued)

OTHER PUBLICATIONS

Sep. 8, 2022 Search Report issued in European Patent Application No. 20849581.2.

(Continued)

*Primary Examiner* — Aneeta Yodichkas  
*Assistant Examiner* — Jose K Abraham  
(74) *Attorney, Agent, or Firm* — Oliff PLC (57) ABSTRACT

A rotor includes: a shaft having a tubular shape; and a rotor core including a through hole into which the shaft is inserted and that has a regular polygonal shape. The shaft is fixed to the rotor core by hydroforming. Of an outer peripheral surface of the shaft, a core contact part that is in contact with the through hole of the rotor core that has the regular polygonal shape has a shape extending along the regular polygonal shape.

1 Claim, 9 Drawing Sheets

(56) References Cited

U.S. PATENT DOCUMENTS

| | | | | |
|---|---|---|---|---|
| 2016/0052045 A1* | 2/2016 | Mizumura | ............... | B21K 1/08 |
| | | | | 29/888.1 |
| 2018/0069450 A1* | 3/2018 | Takeuchi | ............... | H02K 7/003 |
| 2019/0115812 A1* | 4/2019 | Kinpara | ................ | H02K 11/21 |

FOREIGN PATENT DOCUMENTS

| | | | |
|---|---|---|---|
| JP | H08-290220 A | | 11/1996 |
| JP | 2001-268858 A | | 9/2001 |
| JP | 2014-064409 A | | 4/2014 |
| JP | 5945485 B2 | | 7/2016 |
| JP | 2016158354 A | * | 9/2016 |
| JP | 2019-075877 A | | 5/2019 |
| KR | 101271950 B1 | * | 6/2013 |

OTHER PUBLICATIONS

Oct. 27, 2020 Search Report issued in International Patent Application No. PCT/JP2020/030477.

* cited by examiner

MANUFACTURING METHOD OF ROTOR

TECHNICAL FIELD

The present disclosure relates to a rotor and a manufacturing method of a rotor.

BACKGROUND ART

Conventionally, a rotor and a manufacturing method of a rotor in which the rotor has a rotor core having a shaft as a rotation shaft are known. Such a rotor and a manufacturing method of a rotor are disclosed in, for example, Japanese Unexamined Patent Application Publication No. 2001-268858 (JP 2001-268858 A).

JP 2001-268858 A discloses a rotor for a motor including a hollow rotation shaft having a pipe structure and a laminated iron core into which the rotation shaft is inserted. Further, the rotation shaft is provided with a retaining portion formed by a hydroforming method. The retaining portion is formed by expanding the rotation shaft toward an outer diameter side by the hydroforming method. Further, two retaining portions are provided on one side and the other side of the laminated iron core in an axial direction so as to sandwich the laminated iron core in the axial direction. That is, the two retaining portions are provided on the outer side of end surfaces in the axial direction of the laminated iron core. As a result, the laminated iron core and the rotation shaft are fixed (positioned) in the axial direction by the two retaining portions.

Further, the laminated iron core is formed by laminating silicon steel plates provided with one key groove. As a result, the rotation shaft expands by the hydroforming method and thus, a protrusion that meshes with the key groove is formed on the rotation shaft. The protrusion and the key groove mesh and thus, the deviation of the laminated iron core with respect to the rotation shaft in a rotation direction is restricted.

RELATED ART DOCUMENTS

Patent Documents

Patent Document 1: Japanese Unexamined Patent Application Publication No. 2001-268858 (JP 2001-268858 A)

SUMMARY OF THE DISCLOSURE

However, in the rotor described in JP 2001-268858 A, the shape of a boundary portion between the protrusion of the rotation shaft and a cylindrical part of the rotation shaft is a protruding shape toward a radially inner side, and a pipe having a cylindrical shape needs to be greatly changed. For that purpose, it is necessary to relatively increase the pressure of a liquid charged in the rotation shaft in the hydroforming method. In this case, the load due to the deformation of the rotation shaft that is applied to the laminated iron core becomes large. Therefore, by lowering the rigidity of the rotation shaft, the pressure of the liquid can be lowered and the load on the laminated iron core can be reduced. However, there is a problem that a high output cannot be transmitted.

The present disclosure has been made to solve the above problems, and an object of the present disclosure is to provide a rotor and a manufacturing method of a rotor capable of transmitting a high output when a shaft is fixed to a rotor core by hydroforming.

Means for Solving the Problem

In order to achieve the above object, a rotor in a first aspect of the present disclosure includes: a shaft having a tubular shape; and a rotor core including a through hole into which the shaft is inserted; in which the shaft is fixed to the rotor core by hydroforming in which a liquid charged inside the shaft is pressurized to be expanded, in which the through hole has a regular polygonal shape, and in which of an outer peripheral surface of the shaft, a core contact part that is in contact with the through hole of the rotor core that has the regular polygonal shape has a shape extending along the regular polygonal shape.

As described above, in the rotor according to the first aspect of the present disclosure, the through hole has a regular polygonal shape. As a result, since a part having a protruding shape toward the radially inner side is not formed on the outer peripheral surface of the shaft by hydroforming, a deformation amount of the shaft can be reduced. As a result, even when the rigidity of the shaft is increased, the shaft can be easily deformed by the pressure of hydroforming. As a result, the high rigidity of the shaft makes it possible to transmit a high output.

Further, since the through hole has a regular polygonal shape, the pressure due to the deformation of the shaft can be borne by the entire through hole in the circumferential direction, a residual stress of the rotor core is made uniform in the circumferential direction. As a result, since the weakest local portion of the rotor core is relaxed, a rotor having high rigidity can be formed.

A manufacturing method of a rotor according to a second aspect of the present disclosure is a manufacturing method of a rotor including a shaft having a tubular shape and a rotor core including a through hole into which the shaft is inserted, and the manufacturing method includes: an insertion step of inserting the shaft into the through hole having a regular polygonal shape; and a fixing step of fixing the shaft to the rotor core by performing hydroforming in which a liquid charged inside the shaft is pressurized to be expanded with the shaft being inserted into the through hole having the regular polygonal shape, to deform a core contact part, of an outer peripheral surface of the shaft, facing the through hole of the rotor core that has the regular polygonal shape in a radial direction so that the core contact part extends along the regular polygonal shape.

The manufacturing method of a rotor according to the second aspect of the present disclosure has a regular polygonal shape, as described above. As a result, since a part having a protruding shape toward the radially inner side is not formed on the outer peripheral surface of the shaft by hydroforming, a deformation amount of the shaft can be reduced. As a result, even when the rigidity of the shaft is increased, the shaft can be easily deformed by the pressure of hydroforming. As a result, it is possible to provide a manufacturing method of a rotor capable of transmitting a high output due to a high rigidity of the shaft.

Further, since the through hole has a regular polygonal shape, the pressure due to the deformation of the shaft can be borne by the entire through hole in the circumferential direction, a residual stress of the rotor core is made uniform in the circumferential direction. As a result, since the weakest local portion of the rotor core is relaxed, it is possible to provide a manufacturing method of a rotor that can form a rotor having high rigidity.

Effects of the Disclosure

According to the present disclosure, as described above, when the shaft is fixed to the rotor core by hydroforming, a high output can be transmitted.

MODES FOR CARRYING OUT THE DISCLOSURE

Hereinafter, an embodiment of the present disclosure will be described with reference to the drawings.

First Embodiment (Structure of Rotor)

The structure of a rotor 10 according to a first embodiment will be described with reference to FIGS. 1 to 5.

Figure 1:
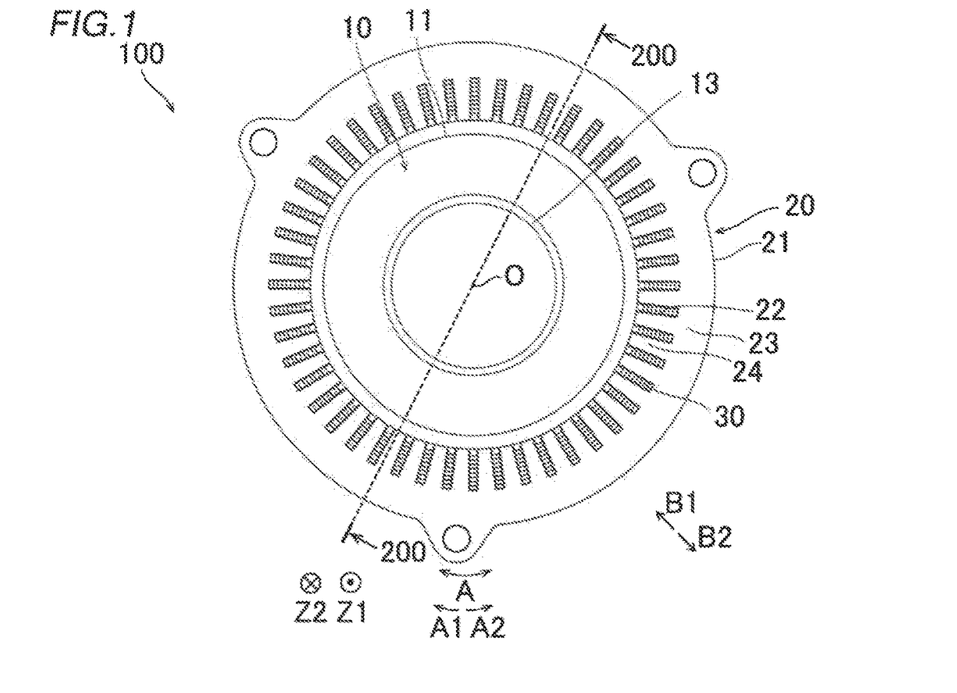
FIG. 1 is a plan view of a rotary electric machine according to a first embodiment.

In the present specification, an "axial direction" means a direction along a rotational axis (symbol O) (Z1 direction, Z2 direction) of the rotor 10 (see FIG. 1). A "circumferential direction" means a circumferential direction (A direction, A1 direction, A2 direction) of a rotor core 11. A "radially inner side" means a direction (B1 direction) toward the center of the rotor core 11. A "radially outer side" means a direction (B2 direction) toward the outside of the rotor core 11.

As shown in FIG. 1, the rotary electric machine 100 includes the rotor 10 and a stator 20. The stator 20 includes an annular stator core 21. The stator core 21 is provided with a plurality of slots 22. A segment conductor 30 is disposed in each of the plurality of slots 22. The stator core 21 includes a back yoke 23 that connects the radially outer side of the slots 22 in an annular shape, and a plurality of teeth 24 provided between adjacent slots 22 and extended to the radially inner side from the back yoke 23. Further, in the slots 22, insulating members (not shown) for insulating the segment conductors 30 and the stator core 21 are disposed.

The rotor 10 includes the rotor core 11 having an annular shape. The rotor core 11 is formed by laminating a plurality of electromagnetic steel plates 12 (see FIG. 2). Further, the rotor core 11 is disposed on the radially inner side of the annular stator core 21 so as to face the stator core 21 in the radial direction. That is, the rotary electric machine 100 is an inner rotor type rotary electric machine.

Further, the rotor 10 includes a shaft 13 that is inserted through (inserted in) a through hole 11a of the rotor core 11. The shaft 13 functions as a rotation shaft of the rotor core 11. Further, the shaft 13 has a cylindrical shape. That is, the shaft 13 has a hollow shape and is formed so as to extend in the axial direction (Z direction).

Figure 2:
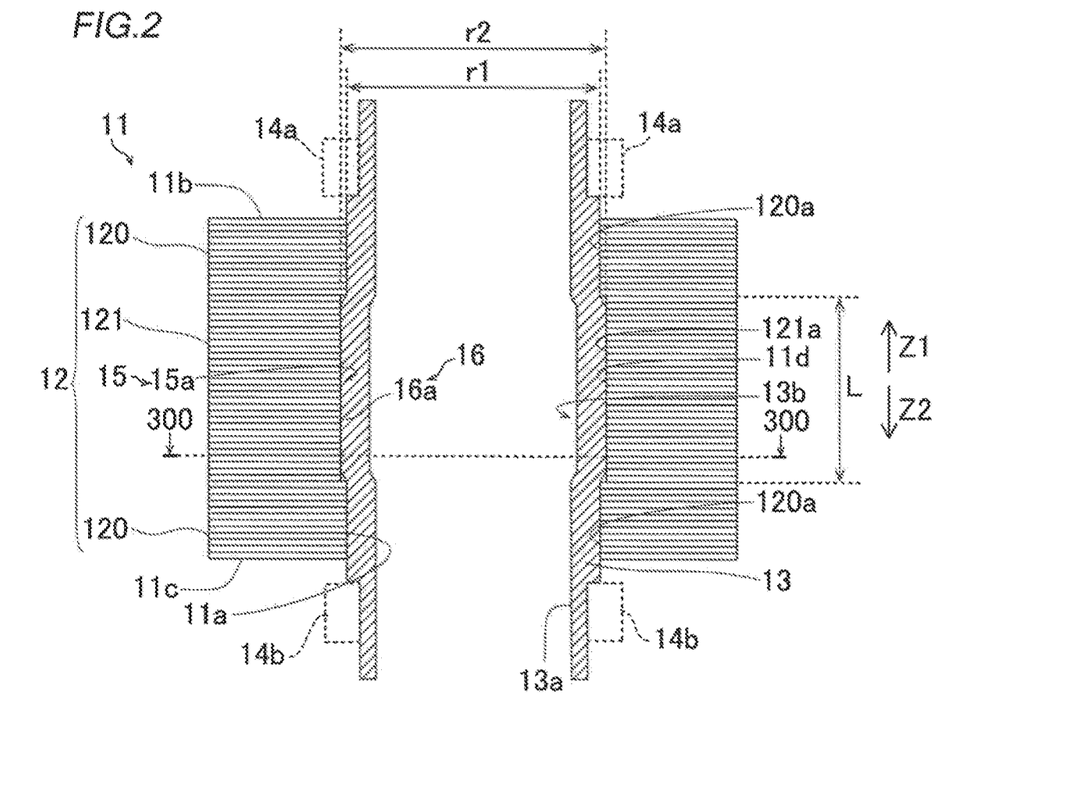
FIG. 2 is a sectional view taken along line 200-200 in FIG. 1.

As shown in FIG. 2, the rotor core 11 includes a first electromagnetic steel plate 120 provided with a through hole 120a into which the shaft 13 is inserted. Further, the plurality of electromagnetic steel plates 12 includes a second electromagnetic steel plate 121 provided with a through hole 121a into which the shaft 13 is inserted. The plurality of electromagnetic steel plates 12 is configured of a plurality of the first electromagnetic steel plates 120 and a plurality of the second electromagnetic steel plates 121. The through hole 11a of the rotor core 11 is configured of the through holes 120a of the first electromagnetic steel plates 120 and the through holes 121a of the second electromagnetic steel plates 121. Further, in FIG. 2 and the drawings onward, in order to clearly show a recessed portion 15a described later, the recessed portion 15a may be shown larger than the actual one. However, the actual case is not limited to this.

Further, the plurality of first electromagnetic steel plates 120, the plurality of second electromagnetic steel plates 121, and the plurality of first electromagnetic steel plates 120 are laminated in this order along the axial direction (Z direction). In other words, the plurality of laminated second electromagnetic steel plates 121 is laminated on top (Z1 direction side) of the plurality of laminated first electromagnetic steel plates 120. Further, the plurality of laminated first electromagnetic steel plates 120 is laminated on top of the plurality of second electromagnetic steel plates 121.

Further, the through hole 120a of each first electromagnetic steel plate 120 has a diameter r1. Further, the through hole 121a of each second electromagnetic steel plate 121 has a diameter r2. The diameter r2 of the through hole 121a is larger than the diameter r1 of the through hole 120a. When viewed in the axial direction (Z direction), the entire through hole 120a overlaps with the through hole 121a. That is, the through hole 120a is provided on an inner side of the through hole 121a (see FIG. 4) when viewed in the axial direction (Z direction). The diameter r2 of the through hole 121a means a length from the center of the through hole 121a having a regular polygonal shape to an outer peripheral edge of the through hole 121a, as described later. That is, the diameter r2 changes in size depending on a phase (a position of the through hole 121a in the circumferential direction).

Further, the rotor 10 is provided with a bearing 14a and a bearing 14b for supporting the shaft 13. The bearing 14a is provided on an outer side (Z1 direction side) in the axial direction (Z direction) with respect to an end surface 11b on one side (Z1 direction side) of the rotor core 11 in the axial direction. Further, the bearing 14b is provided on an outer side (Z2 direction side) in the axial direction (Z direction)

with respect to an end surface 11c on the other side (Z2 direction side) of the rotor core 11 in the axial direction.

Here, in the first embodiment, the rotor core 11 includes a core-side engaging portion 15 provided on an inner side of the end surface 11b (11c) in the axial direction. The core-side engaging portion 15 is configured of the recessed portion 15a. Further, the shaft 13 includes a shaft-side engaging portion 16 configured of a protruding portion 16a that engages with the recessed portion 15a. That is, the core-side engaging portion 15 (recessed portion 15a) and the shaft-side engaging portion 16 (protruding portion 16a) are engaged with each other between the end surface 11b and the end surface 11c in the axial direction. Further, the core-side engaging portion 15 (recessed portion 15a) and the shaft-side engaging portion 16 (protruding portion 16a) are provided at the same positions in the axial direction. In other words, the core-side engaging portion 15 (recessed portion 15a) and the shaft-side engaging portion 16 (protruding portion 16a) are provided so as to face each other in the radial direction.

The recessed portion 15a of the rotor core 11 is provided on an inner peripheral surface 11d of the through hole 11a of the rotor core 11. The recessed portion 15a is recessed outward in the radial direction. Further, the protruding portion 16a of the shaft 13 protrudes toward the recessed portion 15a side (radially outer side) of the rotor core 11. As a result, the protruding portion 16a is provided so as to fit into the recessed portion 15a. That is, the protruding portion 16a is provided so as to overlap with the recessed portion 15a when viewed in the axial direction (see FIG. 4).

Further, in the first embodiment, the protruding portion 16a of the shaft 13 is a part formed so as to protrude outward in the radial direction by hydroforming. Specifically, the protruding portion 16a is formed by an internal pressure from a liquid 40 (see FIG. 9) inside the shaft 13. As a result, as the protruding portion 16a is formed, a recessed portion 13b is formed on a part of the inner peripheral surface 13a of the shaft 13, the part being located on the radially inner side of the protruding portion 16a.

Further, in the first embodiment, the recessed portion 15a of the rotor core 11 is provided on an inner peripheral side of the through holes 121a of the plurality of second electromagnetic steel plates 121. Further, the recessed portion 15a is provided between the first electromagnetic steel plates 120 laminated on both sides of the plurality of second electromagnetic steel plates 121 in the axial direction (Z direction). That is, the recessed portion 15a is a space surrounded by the first electromagnetic steel plates 120 on both sides in the axial direction and the second electromagnetic steel plates 121 on the outer peripheral side.

Further, the recessed portion 15a is formed by having a part of the inner peripheral surface 11d of the rotor core 11 corresponding to the second electromagnetic steel plates 121 (the inner peripheral surface 11d formed by the first electromagnetic steel plates 120) being formed on the outer peripheral side, with respect to the part of the inner peripheral surface 11d corresponding to the first electromagnetic steel plates 120 (the inner peripheral surface 11d formed by the second electromagnetic steel plates 121). The recessed portion 15a is formed as a result of the size of the diameter r1 of the through holes 120a of the first electromagnetic steel plates 120 and the size of the diameter r2 of the through holes 121a of the second electromagnetic steel plates 121 being different.

Specifically, the recessed portion 15a of the rotor core 11 is recessed to the radially outer side by a depth d (see FIG. 3) on the inner peripheral surface 11d. The depth d of the recessed portion 15a is substantially the same size as half ((r2−r1)/2) of the difference between the diameter r2 of the through holes 121a of the second electromagnetic steel plates 121 and the diameter r1 of the through holes 120a of the first electromagnetic steel plates 120. As described above, since the size of the diameter r2 changes in accordance with the phase, the amount of depth d also changes in accordance with the phase (the position of the recessed portion 15a in the circumferential direction).

Further, in the first embodiment, the plurality of second electromagnetic steel plates 121 is provided at the center of the rotor core 11 in the axial direction (Z direction). Specifically, the number of the first electromagnetic steel plates 120 provided on the end surface 11b side (Z1 direction side) of the plurality of second electromagnetic steel plates 121 and the number of the first electromagnetic steel plates 120 provided on the end surface 11c side (Z1 direction side) of the plurality of second electromagnetic steel plates 121) are substantially equal. Further, the number of the second electromagnetic steel plates 121 is substantially equal to the number of the first electromagnetic steel plates 120. In other words, the number of the second electromagnetic steel plates 121 is about twice the number of the first electromagnetic steel plates 120 provided on the Z1 direction side (the number of the first electromagnetic steel plates 120 provided on the Z2 direction side). The relationship between the number of first electromagnetic steel plates 120 and the number of second electromagnetic steel plates 121 is not limited to this.

Figure 3:
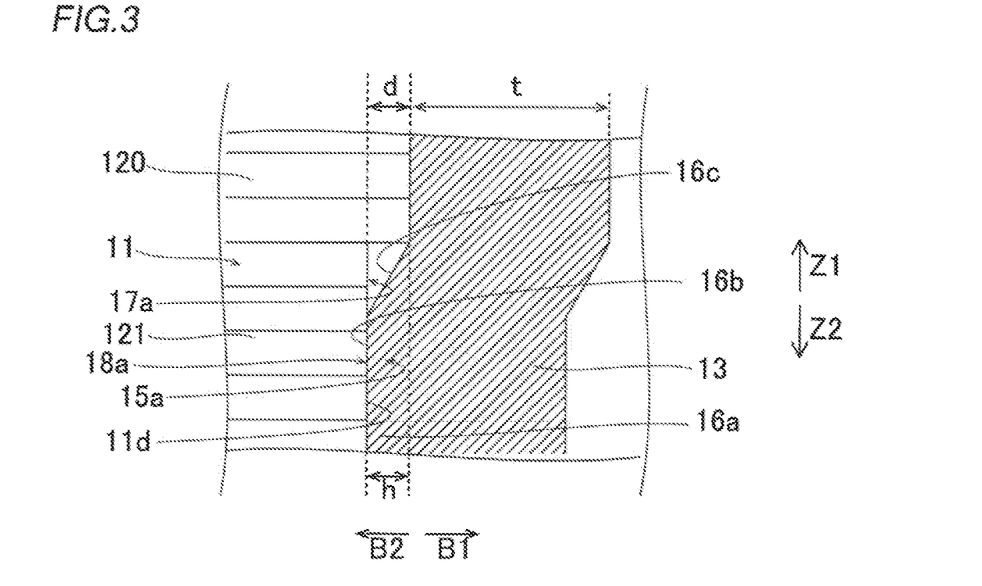
FIG. 3 is a partially enlarged view of FIG. 2.

Further, the recessed portion 15a of the rotor core 11 is configured so that a length L in the axial direction is larger than the depth d in the radial direction (see FIG. 3). Specifically, the length L of the recessed portion 15a is larger than the maximum value of the depth d of the recessed portion 15a in which the amount of the depth d changes in accordance with the phase. Specifically, the length L of the recessed portion 15a is, for example, 100 times or more of the depth d (the maximum value of the depth d) of the recessed portion 15a. The relationship between the length L of the recessed portion 15a and the depth d is not limited to this.

Further, as shown in FIG. 3, the depth d of the recessed portion 15a of the rotor core 11 in the radial direction is smaller than a thickness t of the shaft 13 in the radial direction. Specifically, the maximum value of the depth d of the recessed portion 15a in which the amount of the depth d changes in accordance with the phase is smaller than the thickness t of the shaft 13 in the radial direction. Specifically, the depth d (the maximum value of the depth d) of the recessed portion 15a is, for example, one-tenth or less of the thickness t of the shaft 13. The relationship between the depth d of the recessed portion 15a and the thickness t of the shaft 13 is not limited to this.

Further, the protruding portion 16a of the shaft 13 protrudes toward the recessed portion 15a side (radially outer side) by a height h. The height h of the protruding portion 16a is substantially equal to the depth d of the recessed portions 15a. Specifically, the height h of the protruding portion 16a is substantially equal to the depth d of the recessed portions 15a for each phase (each position of the protruding portion 16a in the circumferential direction). As a result, the end surface 16b of the protruding portion 16a on the radially outer side comes in contact with the plurality of second electromagnetic steel plates 121 from the inner peripheral side.

Further, the protruding portion 16a is provided with inclined surfaces 16c that are provided continuously with the end surface 16b, on both sides of the end surface 16b in the axial direction (Z direction). That is, the protruding portion 16a is formed so as to taper toward the outer peripheral side (toward the end surface 16b side). The axial movement of the shaft 13 is restricted by the inclined surfaces 16c and the first electromagnetic steel plates 120 adjacent to the inclined surfaces 16c in the axial direction.

Figure 4:
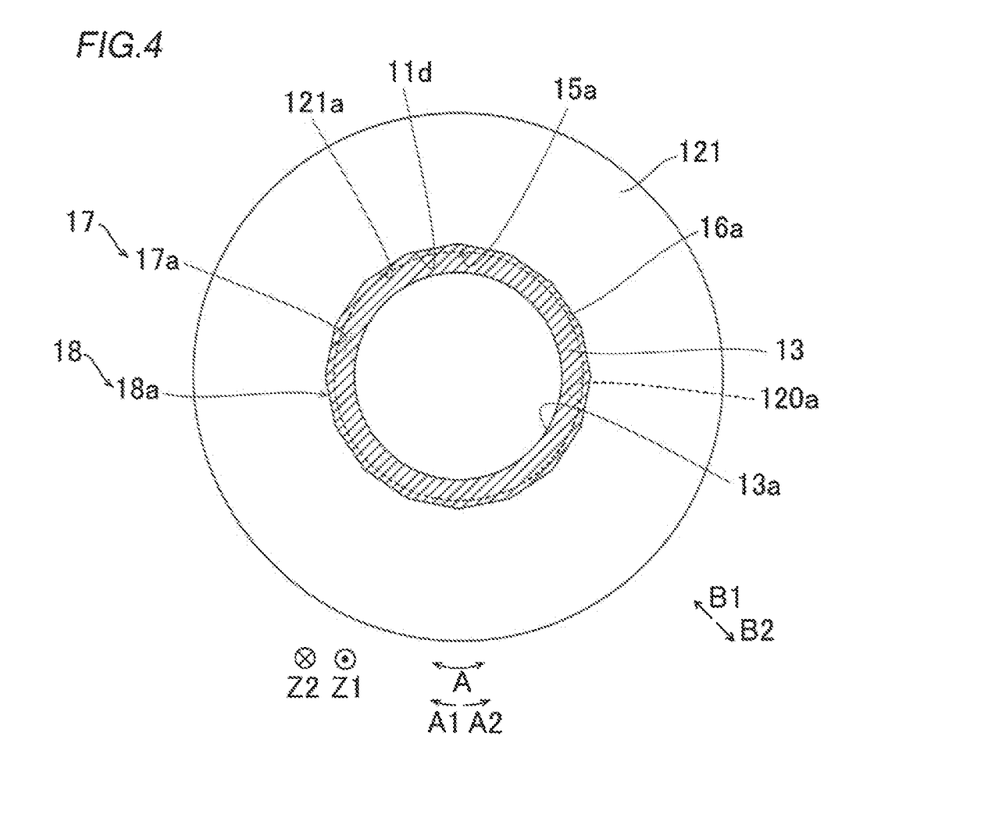
FIG. 4 is a cross-sectional view taken along line 300-300 in FIG. 2.

Further, as shown in FIG. 4, the recessed portion 15a of the rotor core 11 and the protruding portion 16a of the shaft 13 are each provided in a circumferential manner. Specifically, the recessed portion 15a and the protruding portion 16a each have an annular shape when viewed in the axial direction (Z direction). Specifically, when viewed in the axial direction, the recessed portion 15a and the protruding portion 16a are each provided between the through holes 121a of the second electromagnetic steel plates 121 and the through holes 120a of the first electromagnetic steel plates 120. Further, the recessed portion 15a and the protruding portion 16a are each provided in a circumferential manner so that the height in the axial direction is constant. In other words, the recessed portion 15a and the protruding portion 16a each have a non-spiral shape.

Further, the recessed portion 15a of the rotor core 11 has a rotation direction movement restricting portion 17 that restricts the shaft 13 from rotating relative to the rotor core 11. Further, the protruding portion 16a of the shaft 13 has a rotation direction movement restricting portion 18 that restricts the shaft 13 from rotating relative to the rotor core 11. Specifically, the rotation direction movement restricting portion 17 of the recessed portion 15a and each rotation direction movement restricting portion 18 of the protruding portion 16a are configured to engage with each other.

Here, in the first embodiment, the through hole 11a of the rotor core 11 has a regular polygonal shape. The regular polygonal shape has a point-symmetrical shape. That is, the number of vertices of the through hole 11a is an even number. Specifically, the through hole 11a has a regular polygonal shape (point-symmetrical shape) in a cross-sectional view orthogonal to the axial direction (Z direction) of the rotor core 11. The through hole 11a has a regular hexadecagon shape. Further, in the through hole 11a of the rotor core 11, a part of the rotor core 11 in the axial direction (Z direction) has a regular polygonal shape, and the other part of the rotor core 11 in the axial direction has a circular shape.

Figure 5:
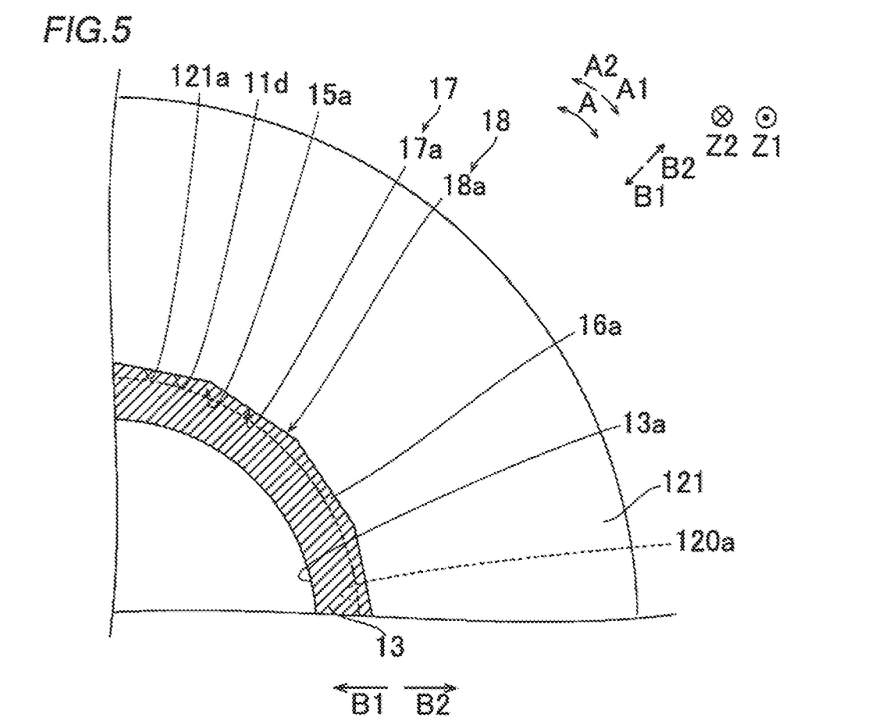
FIG. 5 is a partially enlarged view of FIG. 4.

Specifically, as shown in FIG. 5, the rotation direction movement restricting portion 17 of the recessed portion 15a of the rotor core 11 includes an inner peripheral portion 17a of the recessed portion 15a. The inner peripheral portion 17a of the recessed portion 15a has a regular polygonal shape (regular hexadecagon shape in the first embodiment) when viewed in the axial direction (Z direction) (in the cross-sectional view described above). That is, the through holes 121a of the second electromagnetic steel plates 121 have a regular polygonal shape. The through holes 121a of the plurality of second electromagnetic steel plates 121 are each disposed so as to have the same phase when viewed in the axial direction (positions of corner portions of the polygon in the circumferential direction overlap with each other). Further, the through holes 120a of the first electromagnetic steel plates 120 have a circular shape.

Further, the rotation direction movement restricting portion 18 of the protruding portion 16a of the shaft 13 includes an outer peripheral portion 18a of the protruding portion 16a that engages with the inner peripheral portion 17a of the recessed portion 15a. The outer peripheral portion 18a has a regular polygonal shape (a regular hexadecagon shape in the first embodiment) extended along the shape of the inner peripheral portion 17a of the recessed portion 15a when viewed in the axial direction (Z direction) (in the cross-sectional view described above). Specifically, of the outer peripheral portion 18a of the protruding portion 16a, a part corresponding to the end surface 16b (see FIG. 3) of the protruding portion 16a has a regular polygonal shape that is extended along the shape of the inner peripheral portion 17a of the recessed portions 15a and engages with the inner peripheral portion 17a of the recessed portion 15a. Although not shown, of the outer peripheral portion 18a of the protruding portion 16a, a part corresponding to the inclined surface 16c (see FIG. 3) of the protruding portion 16a is provided on the radially inner side of the inner peripheral portion 17a of the recessed portion 15a. The end surface 16b is an example of a "core contact part" in the claims.

Further, since the through hole 11a having a regular polygonal shape includes a plurality of vertices, the deviation of the rotor core 11 with respect to the shaft 13 in the rotation direction is restricted at each of the plurality of vertices. As a result, compared to the case in which the deviation of the rotor core 11 with respect to the shaft 13 in the rotation direction is restricted at only one place, even if the amount of protrusion of the outer peripheral surface of the shaft 13 toward the vertices of the through hole 11a is relatively small, the deviation of the rotor core 11 with respect to the shaft 13 in the rotation direction is restricted at each of the plurality of vertices and thus, the deviation of the rotor core 11 with respect to the shaft 13 in the rotation direction can be easily restricted. This makes it possible to reduce the pressure of the liquid charged inside the shaft 13 when performing hydroforming. As a result, since the stress applied to the rotor core 11 in hydroforming can be reduced, the residual stress in the rotor core 11 can be reduced. This makes it possible to prevent the rotor core 11 from being damaged by the centrifugal force when the rotor core 11 rotates. That is, when the shaft 13 is fixed to the rotor core 11 by hydroforming, it is possible to prevent the rotor core 11 from being damaged as a result of an increase in the residual stress applied to the rotor core 11.

(Manufacturing Method of Rotor)

Next, with reference to FIGS. 6 to 11, a manufacturing method of the rotor 10 will be described.

Figure 6:
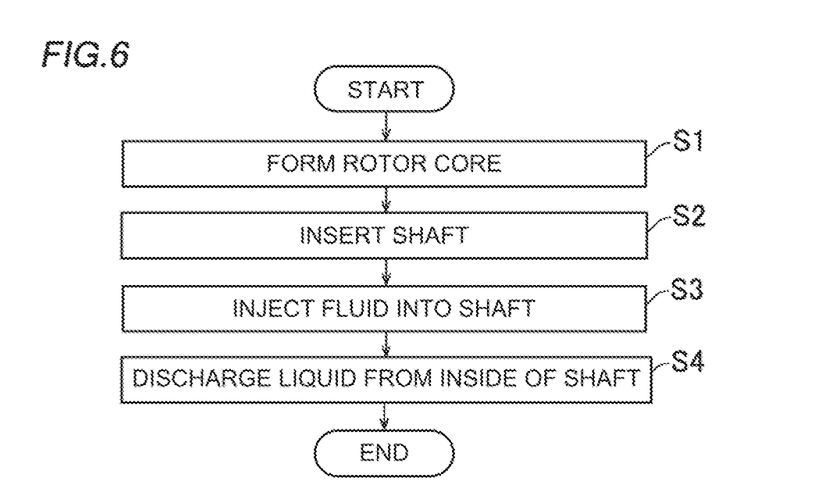
FIG. 6 is a flowchart showing a manufacturing method of a rotor.

As shown in FIG. 6, first, in step S1, the rotor core 11 is formed by laminating the plurality of electromagnetic steel plates 12 (see FIG. 2).

Figure 7:
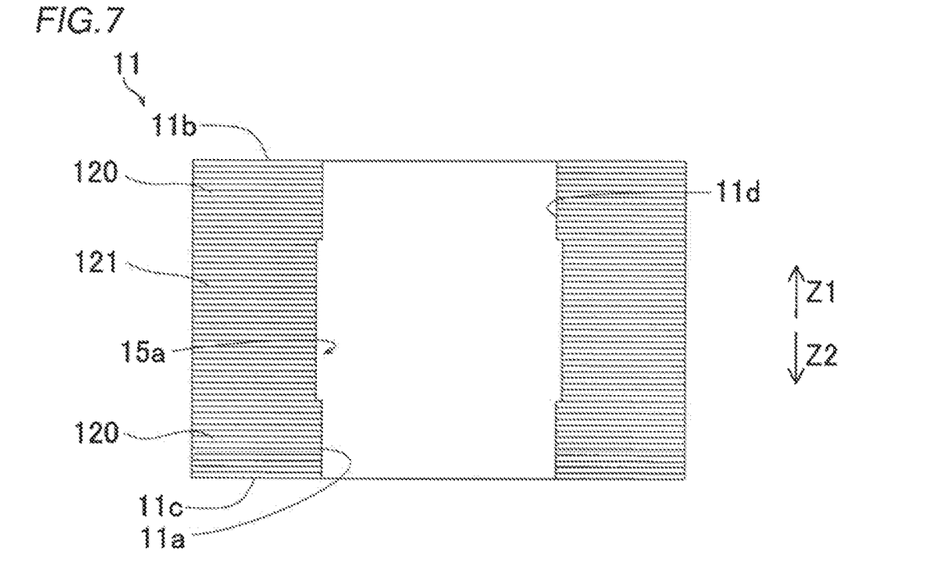
FIG. 7 is a sectional view of a rotor core after step S1 of FIG. 6.

Specifically, as shown in FIG. 7, the plurality of first electromagnetic steel plates 120, the plurality of second electromagnetic steel plates 121, and the plurality of first electromagnetic steel plates 120 are laminated in this order so that the recessed portion 15a of the rotor core 11 is provided on the inner side of the end surfaces (11b, 11c) of the rotor core 11 in the axial direction (Z direction). Further, the plurality of electromagnetic steel plates 12 is laminated so that the recessed portion 15a is provided in a circumferential manner when viewed in the axial direction.

Figure 8:
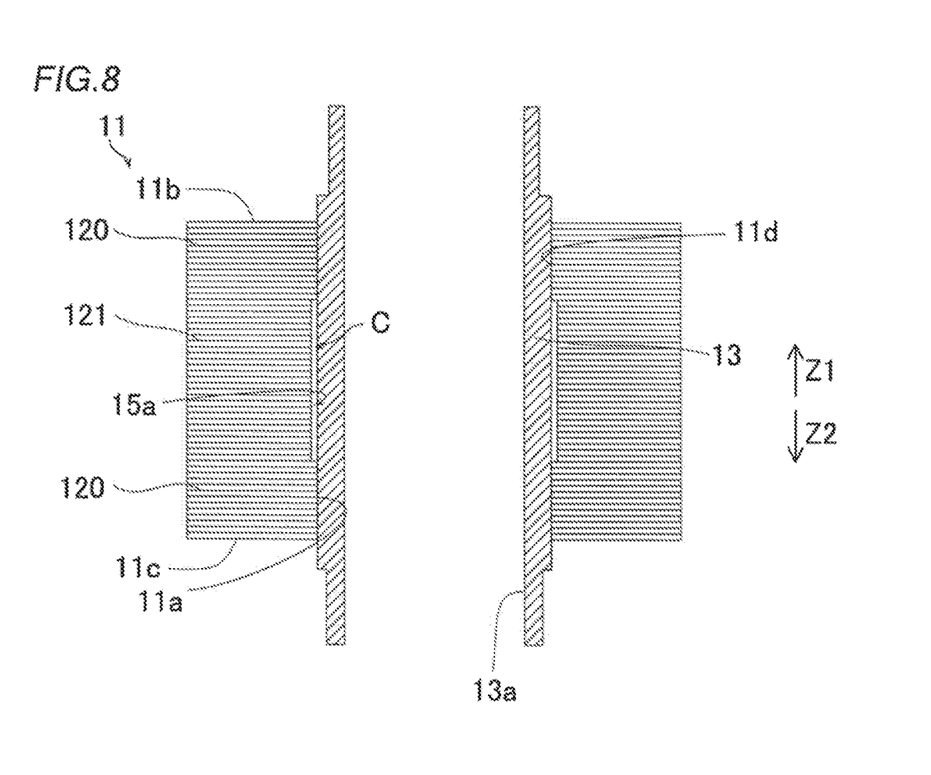
FIG. 8 is a sectional view of the rotor core after step S2 of FIG. 6.

Next, as shown in FIG. 6, in step S2, the shaft 13 is inserted into the through hole 11a of the rotor core 11. For example, the shaft 13 is inserted into the through hole 11a by moving only the shaft 13 in the axial direction while the rotor core 11 is in a fixed state. Further, as shown in FIG. 8, after the shaft 13 is inserted, a clearance C is formed between the recessed portion 15a of the rotor core 11 and the shaft 13.

Figure 9:
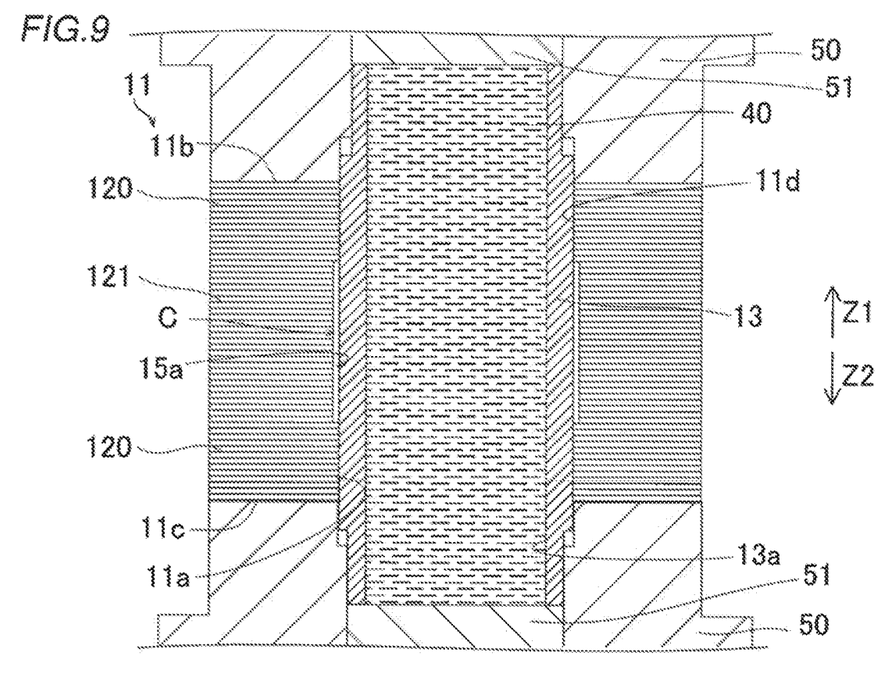
FIG. 9 is a sectional view of the rotor core after a liquid is injected into a shaft in step S3 of FIG. 6.

Next, as shown in FIG. 6, in step S3, the liquid 40 (see FIG. 9) is injected into the shaft 13 and hydroforming is performed. Specifically, as shown in FIG. 9, in a state in which the rotor core 11 is held by pressing jigs 50 and sealing members 51 from both sides in the axial direction, the liquid 40 is injected from an injection port (not shown) of sealing members 41 into the shaft 13. The pressing jigs 50 fix the rotor core 11 and the shaft 13 during the hydroforming process. Further, the sealing members 51 seal the liquid 40 injected into the shaft 13 so that the liquid 40 does not leak to the outside.

Then, the liquid 40 is charged inside the shaft 13. When the charged liquid 40 is pressurized, the shaft 13 expands due to the internal pressure of the liquid 40 (for example, about 200 MPa). As a result, the shaft 13 is pressed against the inner peripheral surface 11d of the rotor core 11.

Figure 10:
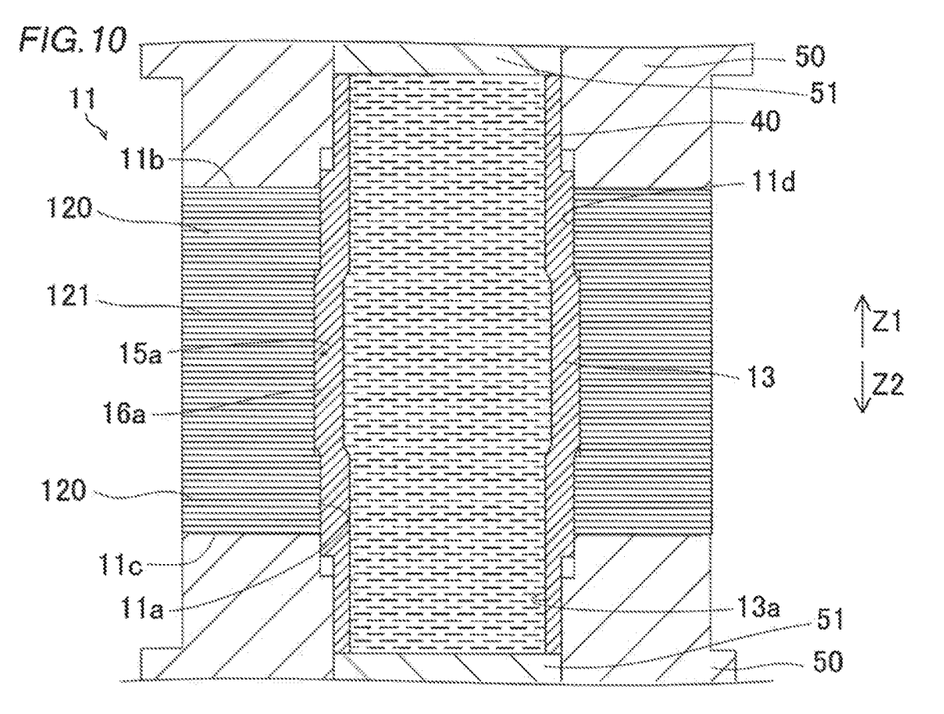
FIG. 10 is a sectional view of the rotor core showing a state in which a protruding portion is formed on the shaft by an internal pressure of the liquid in step S3 of FIG. 6.

At this time, as shown in FIG. 10, the protruding portion 16a that engages with the recessed portion 15a of the rotor core 11 is formed in the shaft 13 by the internal pressure of the liquid 40. Specifically, the shaft 13 is deformed by the pressure of the liquid 40 from the inner peripheral side and thus, the protruding portion 16a that protrudes toward the recessed portion 15a side (radially outer side) is formed. That is, when the shaft 13 is deformed, a part of the shaft 13 (protruding portion 16a) is fitted into the recessed portion 15a of the rotor core 11. As a result, the protruding portion 16a formed in a circumferential manner when viewed in the axial direction is formed. Further, the outer peripheral portion 18a (see FIG. 5) of the protruding portion 16a is formed in a regular polygonal shape so as to extend along a shape (polyangular radius shape, see FIG. 5) of the inner peripheral portion 17a of the recessed portion 15a, when viewed in the axial direction (Z direction) (in the above-described cross-sectional view).

As a result, the protruding portion 16a of the shaft 13 is formed in a state in which the rotor core 11 and the shaft 13 are positioned by the pressing jigs 50 and the sealing members 51. Thus, the rotor core 11 and the shaft 13 can be accurately positioned by the pressing jigs 50 and the sealing members 51.

Further, at this time, the rotor core 11 is slightly moved to the outer peripheral side due to the internal pressure of the liquid 40. Specifically, each of the plurality of first electromagnetic steel plates 120 and the plurality of second electromagnetic steel plates 121 is slightly expanded to the outer peripheral side by the internal pressure of the liquid 40.

Figure 11:
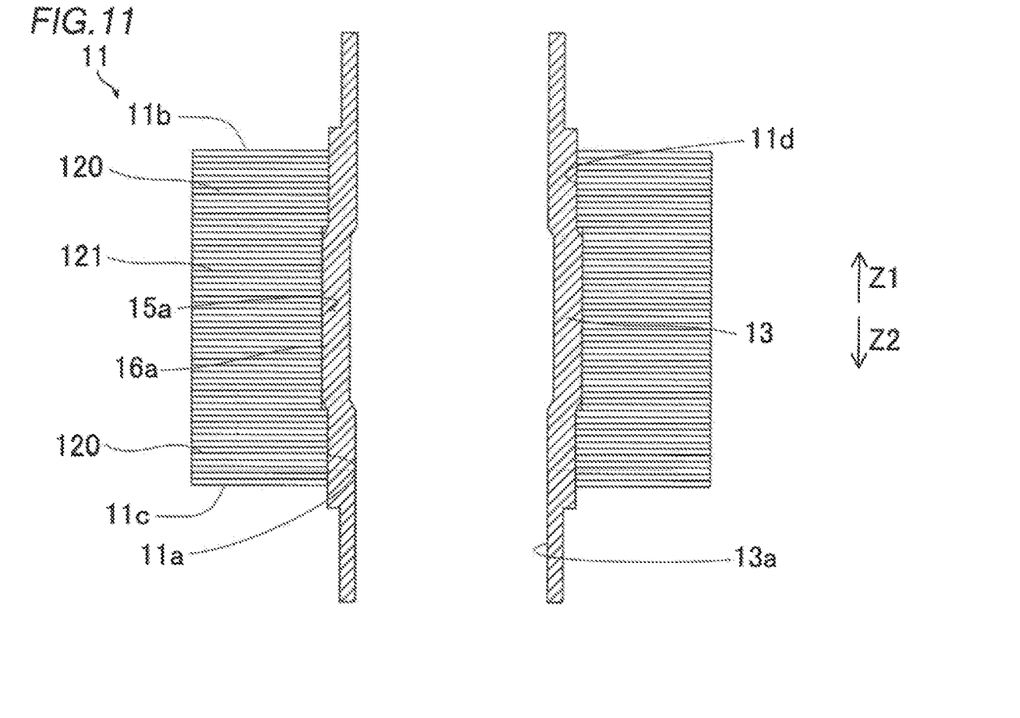
FIG. 11 is a sectional view of the rotor core after step S4 of FIG. 6.

Then, as shown in FIG. 11, in step S4 (see FIG. 6), the liquid 40 inside the shaft 13 is discharged. At this time, the rotor core 11 that is moved (elastically deformed) to the outer peripheral side by the internal pressure of the liquid 40 is compressed due to the internal pressure of the liquid 40 being removed, and attempts to return to the original position. In contrast, since the shaft 13 is plastically deformed by the internal pressure of the liquid 40, the deformed shape is maintained. As a result, the rotor core 11 that compresses to the inner peripheral side and the shaft 13 that retains its shape are pressure-welded (fastened). That is, the rotor core 11 and the shaft 13 are pressure-welded (fastened) by using the compressive stress of the rotor core 11. As a result, the protruding portion 16a of the shaft 13 is pressure-welded (fastened) to the inner peripheral surface 11d of the rotor core 11.

Second Embodiment

Next, a rotor 210 and a manufacturing method of the rotor 210 according to a second embodiment will be described with reference to FIGS. 12 to 16. Unlike the first embodiment in which only the second electromagnetic steel plates 121 corresponding to the recessed portion 15a have the regular polygonal through holes 121a when viewed in the axial direction, in the rotor 210 of the second embodiment, through holes 212a of all electromagnetic steel plates 212 of the rotor core 211 have a regular polygonal shape when viewed in the axial direction. The same configurations as those in the first embodiment described above are indicated by the same reference numerals as those in the first embodiment and are shown in the drawings, and the description thereof will be omitted.

(Structure of Rotor)

Figure 12:
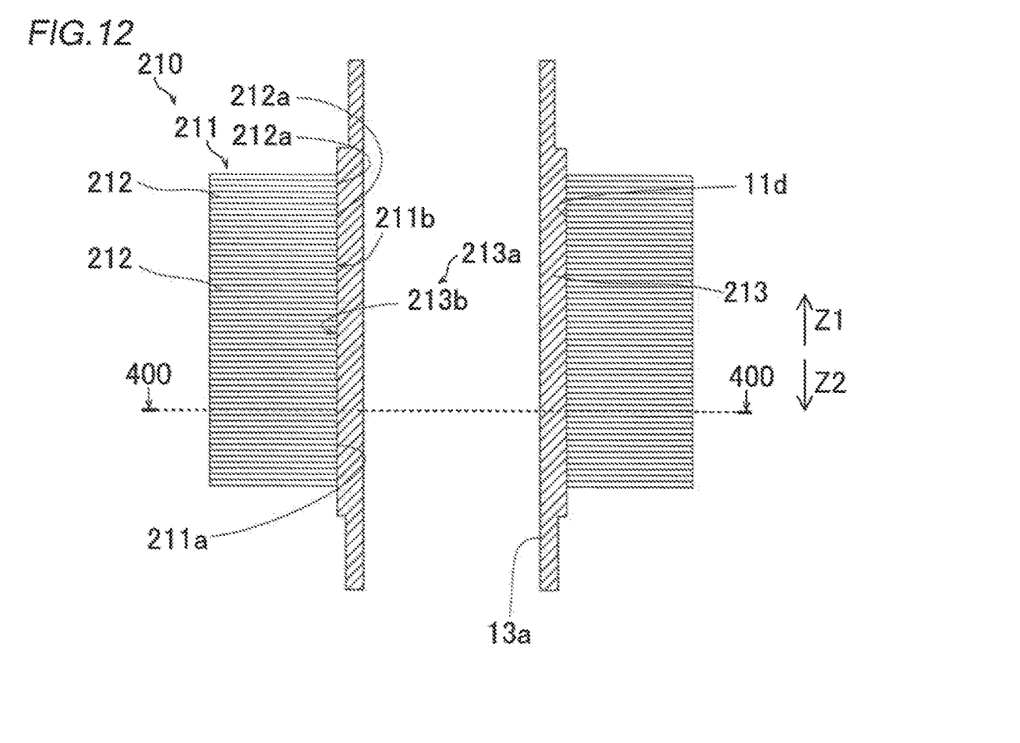
FIG. 12 is a sectional view of a rotor (rotor core) according to a second embodiment.

As shown in FIG. 12, the rotor 210 includes a rotor core 211. The rotor core 211 is formed by laminating the plurality of electromagnetic steel plates 212. The through holes 211a of the rotor core 211 are formed by stacking the through holes 212a provided in the plurality of electromagnetic steel plates 212.

Further, the rotor 210 includes a shaft 213 that is inserted through (inserted in) a through hole 211a of the rotor core 211. The shaft 213 is fixed to the rotor core 211 by hydroforming in which the liquid 40 charged inside the shaft 213 is pressurized to be expanded (see FIG. 9).

Here, in the second embodiment, the through hole 211a is configured by a polygonal part 211b in which at least a part of the rotor core 211 in the axial direction has a regular polygonal shape (for example, a regular hexadecagon shape: see FIG. 13) when viewed in the axial direction. Specifically, the polygonal part 211b is provided to extend from one end to the other end of the rotor core 211 in the axial direction. That is, the through hole 212a of each of the plurality of electromagnetic steel plates 212 has a regular polygonal shape (for example, a regular hexadecagon shape: see FIG. 13) when viewed in the axial direction.

Figure 13:
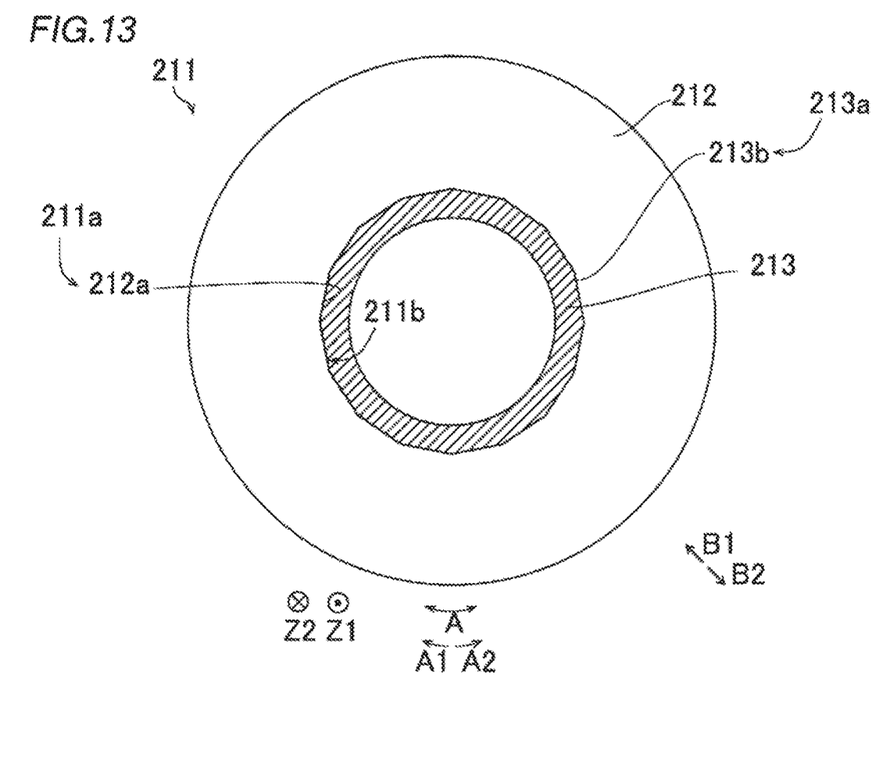
FIG. 13 is a cross-sectional view taken along line 400-400 in FIG. 12.

Further, the outer peripheral surface 213a of the shaft 213 includes a core contact part 213b that is in contact with the polygonal part 211b of the through hole 211a of the rotor core 211. As shown in FIG. 13, the core contact part 213b has a regular polygonal shape along the polygonal part 211b when viewed in the axial direction. That is, the core contact part 213b has a regular polygonal shape extending along the polygonal part 211b from one end of the rotor core 211 to the other end of the rotor core 211 in the axial direction, when viewed in the axial direction (in a cross-sectional view orthogonal to the axial direction of the rotor core 211).

(Manufacturing Method of Rotor)

Figure 15:
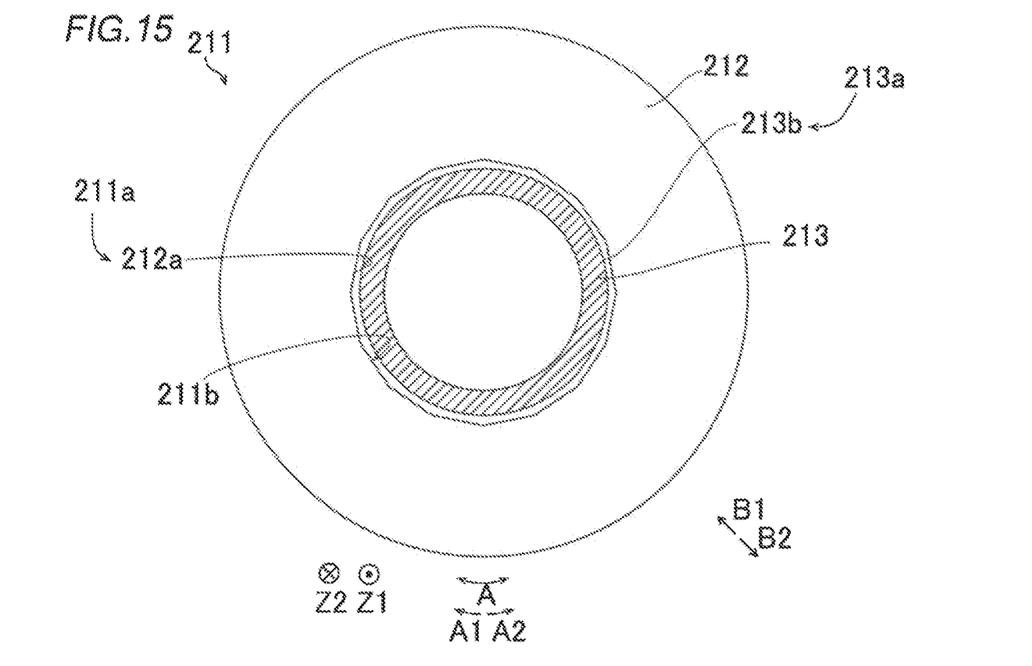
FIG. 15 is a plan cross-sectional view after inserting a shaft according to the second embodiment into the rotor core and before performing hydroforming.
Figure 16:
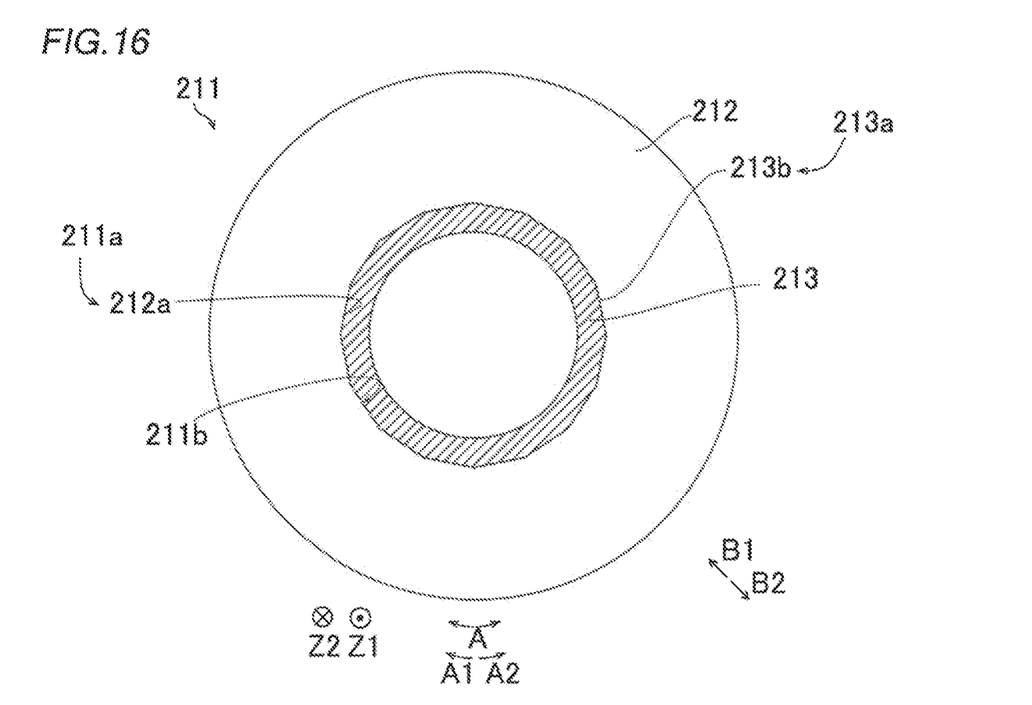
FIG. 16 is a plan cross-sectional view after performing hydroforming according to the second embodiment.

Next, with reference to FIGS. 14 to 16, a manufacturing method of the rotor 210 will be described.

Figure 14:
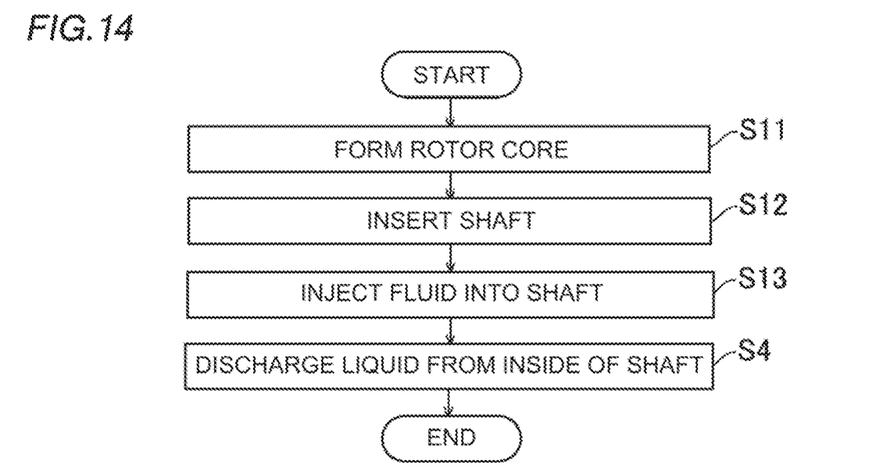
FIG. 14 is a flowchart showing a manufacturing method of a rotor according to the second embodiment.

As shown in FIG. 14, first, in step S11, the rotor core 211 is formed by laminating the plurality of electromagnetic steel plates 212 (see FIG. 12).

Next, in step S12, the shaft 213 is inserted into the through hole 211a of the rotor core 211. Specifically, the shaft 213 having a cylindrical shape (see FIG. 15) is inserted into the through hole 211a in which the polygonal part 211b has a regular polygonal shape when viewed in the axial direction. As a result, the core contact part 213b of the shaft 213 faces the polygonal part 211b of the through hole 211a of the rotor core 211 in the radial direction.

Next, in step S13, a step of fixing the shaft 213 to the rotor core 211 is performed by performing hydroforming of causing the liquid 40 (see FIG. 9) to flow into the shaft 213 and pressurizing the liquid 40. Specifically, the shaft 213 is fixed to the rotor core 211 by deforming the core contact part 213b of the shaft 213 facing the polygonal part 211b of the through hole 211a of the rotor core 211 in the radial direction into a regular polygonal shape (regular hexadecagon shape) extending along the polygonal part 211b (regular polygonal shape) when viewed in the axial direction.

Other configurations of the second embodiment are the same as those of the first embodiment.

[Effects of First and Second Embodiments]

In the first and second embodiments, the following effects can be obtained.

(Effects of Rotor)

In the first and second embodiments, the through hole (11a, 211a) has a regular polygonal shape, as described above. Further, of an outer peripheral surface (213a) of the shaft (13, 213), a core contact part (16b, 213b) that is in contact with the through hole (11a, 211a) of the rotor core (11, 211) that has the regular polygonal shape has a shape extending along the regular polygonal shape. As a result, since a part having a protruding shape toward the radially inner side is not formed on the outer peripheral surface (213a) of the shaft (13, 213) by hydroforming, the deformation amount of the shaft (13, 213) can be reduced. As a result, even when the rigidity of the shaft (13, 213) is increased, the shaft (13, 213) can be easily deformed by the pressure of hydroforming. As a result, the high rigidity of the shaft (13, 213) makes it possible to transmit a high output.

Further, since the through hole (11a, 211a) has a regular polygonal shape, the pressure due to the deformation of the shaft (13, 213) can be borne by the entire through hole (11a, 211a) in the circumferential direction, the residual stress of the rotor core (11, 211) is made uniform in the circumferential direction. As a result, since the weakest local portion of the rotor core (11, 211) is relaxed, the rotor (10, 210) having high rigidity can be formed.

Further, in the first and second embodiments, as described above, the regular polygonal shape has a point-symmetrical shape. As a result, the deviation of the rotor core (11, 211) with respect to the shaft (13, 213) in the rotation direction can be prevented in a well-balanced manner. This makes it possible to reduce the pressure of the liquid (40) charged inside the shaft (13, 213) when performing hydroforming. Thus, since the stress applied to the rotor core (11, 211) in hydroforming can be further reduced, the residual stress in the rotor core (11, 211) can be further reduced. This makes it possible to more reliably prevent the rotor core (11, 211) from being damaged by the centrifugal force when the rotor core (11, 211) rotates.

Further, in the first embodiment, in the through hole (11a) of the rotor core (11), a part in an axial direction of the rotor core (11) has the regular polygonal shape, and another part in the axial direction has a circular shape, as described above. Thus, a step is formed between the part of the rotor core (11) having a regular polygonal shape and the part of the rotor core (11) having a circular shape. As a result, since the shaft (13) expanded by hydroforming and the above-described step are engaged in the axial direction, it is possible to more surely restrict the movement of the shaft (13) in the axial direction.

Further, in the second embodiment, the through hole (211a) of the rotor core (211) has the regular polygonal shape extending from one end to the other end of the rotor core (211) in an axial direction of the rotor core (211), as described above. Further, the core contact part (213b) of the outer peripheral surface (213a) of the shaft (213) has a shape extending along the regular polygonal shape from the one end of the rotor core (211) to the other end of the rotor core (211). As a result, the deviation of the rotor core (211) with respect to the shaft (213) in the rotation direction is restricted at each of the plurality of vertices from one end of the rotor core (211) to the other end of the rotor core (211). As a result, since the pressure of the liquid (40) during hydroforming can be further reduced, the residual stress in the rotor core (211) can be further reduced. Further, since it is not necessary to use an electromagnetic steel plate in which the through hole does not have a polygonal shape, the number of types of part can be reduced.

(Effects of Manufacturing Method of Rotor)

In the first and second embodiments, as described above, the manufacturing method of the rotor (10, 20) includes: a fixing step of fixing the shaft (13, 213) to the rotor core (11, 211) by performing hydroforming in which a liquid (40) charged inside the shaft (13, 213) is pressurized to be expanded with the shaft (13, 213) being inserted into the through hole (11a, 211a) having the regular polygonal shape, to deform a core contact part (16b, 213b), of an outer peripheral surface (213a) of the shaft (13, 213), facing the through hole (11a, 211a) of the rotor core (11, 211) that has the regular polygonal shape in a radial direction so that the core contact part (16b, 213b) extends along the regular polygonal shape. As a result, since a part having a protruding shape toward the radially inner side is not formed on the outer peripheral surface (213a) of the shaft (13, 213) by hydroforming, the deformation amount of the shaft (13, 213) can be reduced. As a result, even when the rigidity of the shaft (13, 213) is increased, the shaft (13, 213) can be easily deformed by the pressure of hydroforming. As a result, it is possible to provide a manufacturing method of a rotor (10, 210) capable of transmitting a high output due to a high rigidity of the shaft (13, 213).

Further, since the through hole (11a, 211a) has a regular polygonal shape, the pressure due to the deformation of the shaft (13, 213) can be borne by the entire through hole (11a, 211a) in the circumferential direction, the residual stress of the rotor core (11, 211) is made uniform in the circumferential direction. As a result, since the weakest local portion of the rotor core (11, 211) is relaxed, it is possible to provide the manufacturing method of the rotor (10, 210) capable of forming the rotor (10, 210) having high rigidity.

Further, in the first and second embodiments, as described above, the insertion step is a step of inserting the shaft (13, 213) having a cylindrical shape into the through hole (11a, 211a) having the regular polygonal shape. Further, the fixing step is a step of fixing the shaft (13, 213) to the rotor core (11, 211) by performing hydroforming to deform the core contact part (16b, 213b) of the outer peripheral surface (213a) of the shaft (13, 213) into the regular polygonal shape. As a result, the shaft (13, 213) having a cylindrical shape can be deformed into a regular polygonal shape extended along the through hole (11a, 211a) having a regular polygonal shape.

[Modifications]

It should be considered that the embodiments presently disclosed are exemplifications in all points and are not restrictive. The scope of the present disclosure is shown by the scope of the claims and not by the above description of the embodiments, and further includes the meanings equivalent to the scope of the claims and all changes (modifications) within the scope.

For example, in the first embodiment, an example is shown in which the core-side engaging portion 15 is configured of the recessed portion 15a and the shaft-side engaging portion 16 is configured of the protruding portion 16a. However, the present disclosure is not limited to this. For example, the core-side engaging portion may be configured of a protrusion and the shaft-side engaging portion may be configured of a recessed portion.

Figure 17:
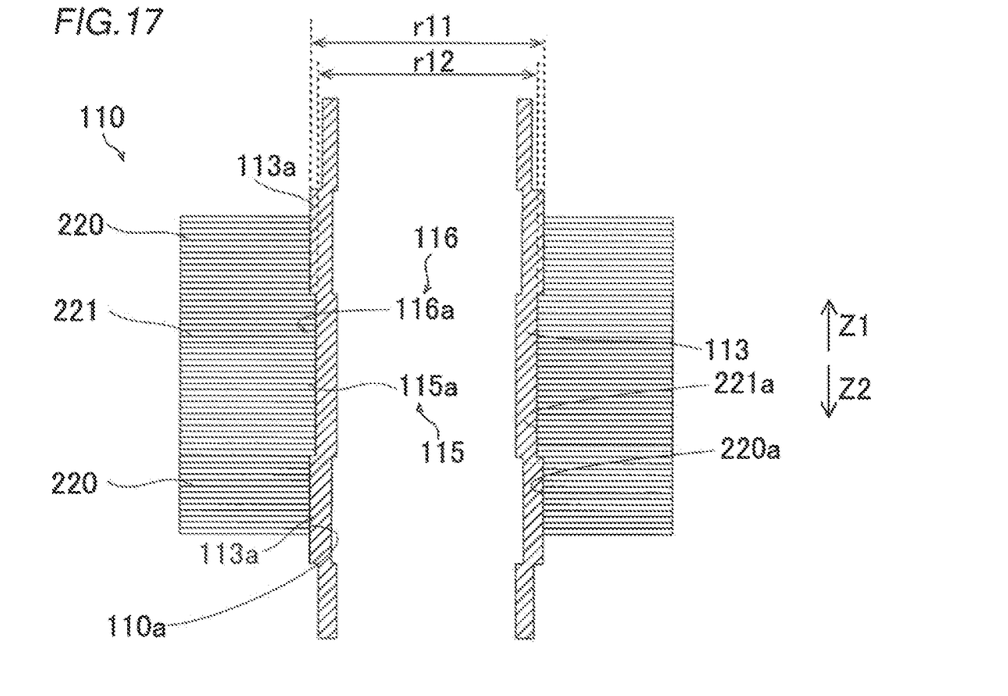
FIG. 17 is a sectional view of a rotor core of a first modification of the first embodiment.

Specifically, as shown in FIG. 17, the rotor core 110 includes a core-side engaging portion 115 configured of a protrusion 115a. Further, the shaft 113 includes a shaft-side engaging portion 116 configured of a recessed portion 116a. In this case, the rotor core 110 is formed by laminating first electromagnetic steel plates 220 each having a through hole 220a with a diameter r11 and second electromagnetic steel plates 221 each having a through hole 221a with a diameter r12 that is smaller than the diameter r11. The through hole 110a of the rotor core 110 is configured of the through holes 220a and the through holes 221a. In this case, the protrusion 115a of the rotor core 110 is configured of a part of the second electromagnetic steel plates 221 protruding to the inner peripheral side from the first electromagnetic steel plates 220 when viewed in the axial direction (Z direction). Note that the recessed portion 116a of the shaft 113 is a part sandwiched in the axial direction between the protruding portions 113a of the shaft 113 provided on both sides of the recessed portion 116a in the axial direction. The protruding portion 113a is provided so as to protrude radially outward. Further, the protruding portion 113a is a part that is formed by hydroforming.

Further, in the first embodiment, an example is shown in which each of the recessed portion 15a of the rotor core 11 and the protruding portion 16a of the shaft 13 is provided in a circumferential manner (over the entire circumference). However, the present disclosure is not limited to this. For example, each of the recessed portion of the rotor core and the protruding portion of the shaft may be provided on a part of the entire circumference. In this case, a plurality of the recessed portions and a plurality of the protruding portions may be provided in a circumferential manner.

Further, in the above-described first embodiment, an example is shown in which all of the plurality of second electromagnetic steel plates 121 are laminated at the center of the rotor core 11 in the axial direction. However, the present disclosure is not limited to this. For example, a plurality of groups formed by laminating the plurality of second electromagnetic steel plates 121 may be provided at predetermined intervals in the axial direction.

Further, in the first embodiment, an example is shown in which the plurality of second electromagnetic steel plates 121 is provided at the center of the rotor core 11 in the axial direction. However, the present disclosure is not limited to this. For example, the plurality of second electromagnetic steel plates 121 may be disposed closer to one of the end surface 11b and the end surface 11c than the center of the rotor core 11 in the axial direction.

Further, in the first embodiment, an example is shown in which each of the recessed portion 15a of the rotor core 11 and the protruding portion 16a of the shaft 13 is provided in a circumferential manner so that the positions in the axial direction are constant (non-spiral shape). However, the present disclosure is not limited to this. For example, each of the recessed portion of the rotor core and the protruding portion of the shaft may be provided in a spiral shape. Further, the recessed portion and the protruding portion having a spiral shape may be provided on each of one side and the other side in the axial direction. In this case, the inclination directions of the recessed portion and the protruding portion on both sides in the axial direction may be opposite to each other.

Further, in the first embodiment, an example is shown in which each of the inner peripheral portion 17a of the recessed portion 15a of the rotor core 11 and the outer peripheral portion 18a of the protruding portion 16a of the shaft 13 has a regular hexadecagon shape. However, the present disclosure is not limited to this. For example, each of the inner peripheral portion of the recessed portion of the rotor core and the outer peripheral portion of the protruding portion of the shaft may have a polygon shape other than a regular hexadecagon shape (for example, a regular triacontadigon shape). Further, the through hole 211a of the rotor core 211 in the second embodiment may have a regular polygonal shape other than the regular hexadecagon shape (for example, a regular triacontadigon shape).

Further, in the first and second embodiments, examples have been shown in which the through hole (11a, 211a) of the rotor core (11, 211) has a point-symmetrical shape. However, the present disclosure is not limited to this. The through hole (11a, 211a) may have a shape that is not point-symmetrical (that is, the number of vertices may be odd).

Further, in the first embodiment, an example is shown in which the through hole 120a of the first electromagnetic steel plate 120 has a circular shape when viewed in the axial direction. However, the present disclosure is not limited to this. For example, the through hole of the first electromagnetic steel plate may have a regular polygonal shape when viewed in the axial direction, similar to the through hole 121a of the second electromagnetic steel plate 121.

Further, in the first and second embodiments, an example is shown in which the rotary electric machine is an inner rotor type rotary electric machine. However, the present disclosure is not limited to this. For example, the rotary electric machine may be an outer rotor type rotary electric machine.

DESCRIPTION OF THE REFERENCE NUMERALS 10, 210 rotor
11, 110, 211 rotor core
11a, 110a, 211a through hole
13, 113, 213 shaft
16b end surface (core contact part)
40 liquid
213a outer peripheral surface
213b core contact part

The invention claimed is:

1. A manufacturing method of a rotor including a shaft having a tubular shape and a rotor core including a through hole into which the shaft is inserted, the manufacturing method comprising:
   an insertion step of inserting the shaft into the through hole having a regular polygonal shape; and
   a fixing step of fixing the shaft to the rotor core by performing hydroforming in which a liquid charged inside the shaft is pressurized to be expanded with the shaft being inserted into the through hole having the regular polygonal shape, to deform a core contact part, of an outer peripheral surface of the shaft, facing the through hole of the rotor core that has the regular polygonal shape in a radial direction so that the core contact part extends along the regular polygonal shape,
   wherein the insertion step is a step of inserting the shaft having a cylindrical shape into the through hole having the regular polygonal shape, and
   wherein the fixing step is a step of fixing the shaft to the rotor core by performing hydroforming to deform the core contact part of the outer peripheral surface of the shaft into the regular polygonal shape.

* * * * *